Figure 1:
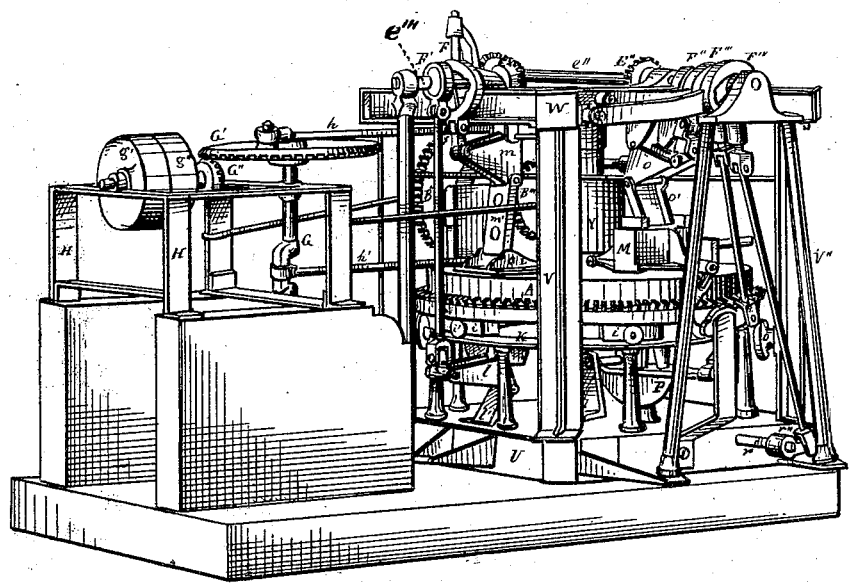

W. L. GREGG.
Brick-Machine.

No. 168,564.

Patented Oct. 11, 1875.

4 Sheets--Sheet 1

Attest.
Wm. H. Lotz
C. W. Schuellermann.

Inventor.
Wm. L. Gregg,
by J. Snowden Bell
Atty.

W. L. GREGG.
Brick-Machine.

No. 168,564. Patented Oct. 11, 1875.

Attest.
Wm. H. Lotz
C. W. Schuellermann

Inventor
Wm. L. Gregg.
by J. Snowden Bell
atty.

W. L. GREGG.
Brick-Machine.
No. 168,564. Fig. 5 Patented Oct. 11, 1875.
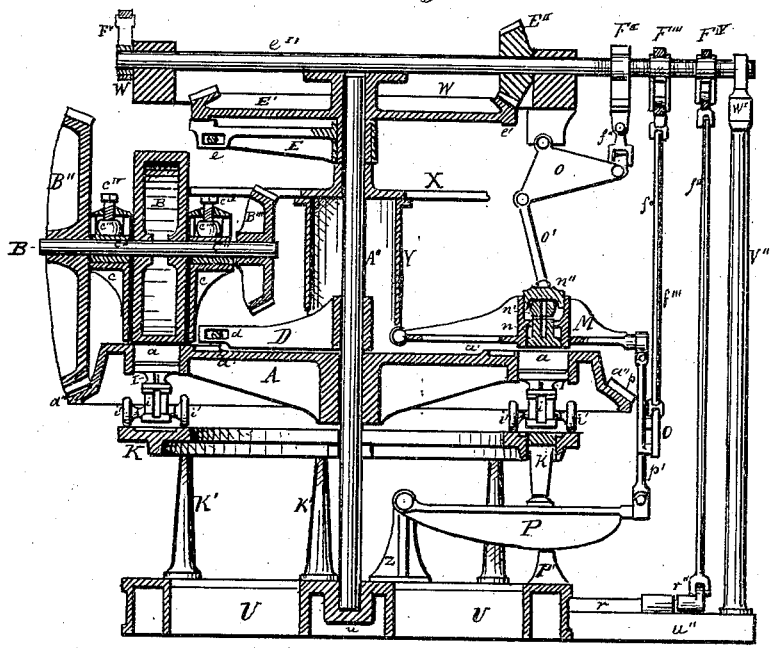
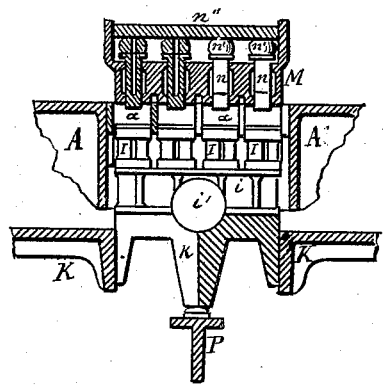
Fig. 6.
Attest.
Wm H Lotz
C W Schuellermann
Inventor.
Wm L Gregg,
by J Snowden Bell
atty.

W. L. GREGG.
Brick-Machine.

No. 168,564.

4 Sheets--Sheet 4.

Patented Oct. 11, 1875.

Attest.
Wm H. Lotz
C. W. Schuellermann

Inventor.
Wm L. Gregg,
by J. Snowden Bell
atty

UNITED STATES PATENT OFFICE.

WILLIAM L. GREGG, OF CHICAGO, ILLINOIS.

IMPROVEMENT IN BRICK-MACHINES.

Specification forming part of Letters Patent No. 168,564, dated October 11, 1875; application filed August 23, 1875.

*To all whom it may concern:*

Be it known that I, WILLIAM L. GREGG, of Chicago, in the county of Cook and State of Illinois, have invented certain new and useful Improvements in Brick-Machines, of which the following is a specification:

My improvements relate to that class of brick-machines in which a series of pressures are imparted to clay contained in the mold-boxes of an intermittently-rotating mold-table; and the object of my invention is to provide suitable means for filling the mold-boxes with clay and compacting the clay therein; for imparting pressure to the clay in the mold-boxes from two different sides thereof; for compensating any irregularity or inequality of supply to the several mold-boxes; and, finally, for expelling the finished brick from the mold-boxes and removing them from the mold-table, to which ends my improvements consist, first, in combining a mold-table and mold-boxes, a movable pressure-plate, and pressure-cams, and toggle-joint levers, which impart pressure to the clay in the mold-boxes from the lower sides thereof; second, in combining a mold-table and mold-boxes, pressure-cams and toggle-joint levers, and yielding plungers for recessing or paneling the bricks while pressing the clay from the upper sides of the mold-boxes; third, in combining a mold-table and mold-boxes, cams and levers, a vertically-moving plunger, and a sliding plate, to expel the finished bricks from the boxes.

In the construction of face-bricks by machinery, as heretofore practiced, much difficulty has been experienced by reason of the fact that it is practically impossible to supply an equal amount of clay to each of the mold-boxes, from which it results that the bricks are not of equal size and density. Moreover, when pressure is imparted to the clay from one side only, as has heretofore been the case, the bricks are often defective in strength at their corners and edges, and hence unsuitable for use as first quality or front bricks.

My improvements are designed to provide a machine in the operation of which these objections will be practically overcome, and the devices employed by me for the purpose are hereinafter fully set forth.

Figure 2:
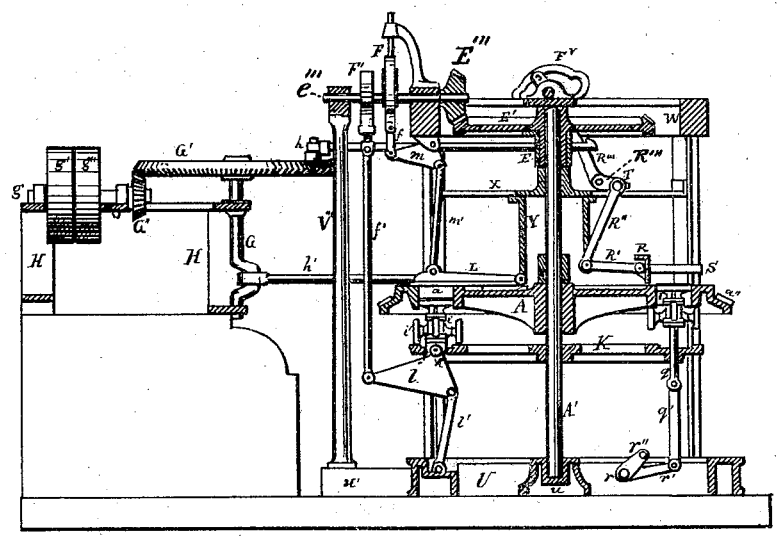
Figure 3:
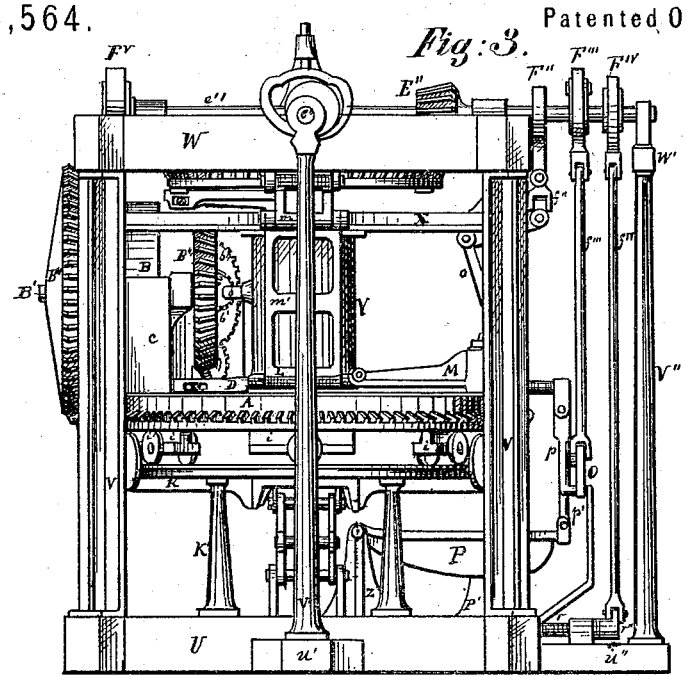
Figure 4:
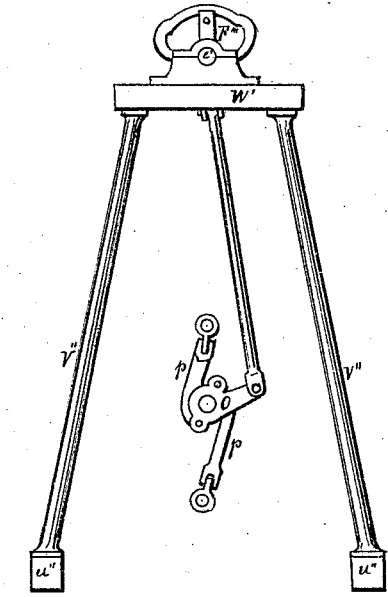
Figure 7:
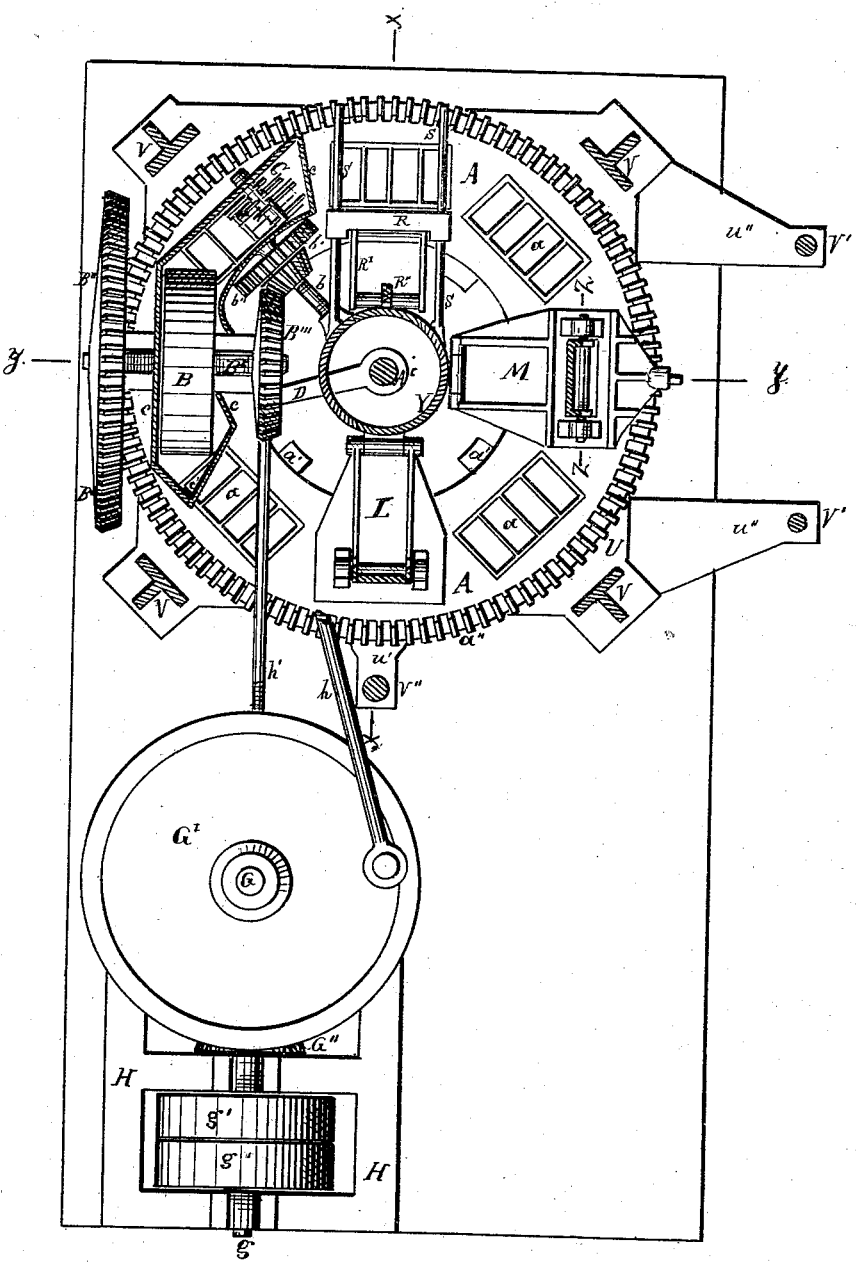

In the accompanying drawings, Figure 1 is a view in perspective of a brick-machine embodying my improvements; Fig. 2, a vertical longitudinal section of the same at the line $x$ $x$ of Fig. 7; Fig. 3, an end elevation of the same from the side of the driving-gears, said gears being removed to exhibit the construction more plainly; Fig. 4, a view in elevation of the triple crank and connections, by which the final pressure is imparted to the clay; Fig. 5, a vertical section of the machine at the line $y$ $y$ of Fig. 7; Fig. 6, a section on an enlarged scale of the device for paneling or recessing the bricks; and Fig. 7, a sectional plan of the machine at a point above the mold-table.

The machine proper—that is to say, all excepting the driving-pulleys and the counter-shaft and first pair of gears, which receive motion from them—is supported upon a substantial bed-plate, U, which may be secured to any suitable foundation. The bed-plate is connected by columns V to an upper frame, W. A lighter frame, X, is secured to the columns V below the upper frame, and carries a central cylindrical bracket, Y. A circular mold-table, A, is secured upon a vertical shaft, A', rotating in a step, $u$, on the bed-plate and in a bearing in the upper frame W, and in order to give greater steadiness to the mold-table its bottom rests upon rollers turning upon studs secured to the inner faces of the columns V. The mold-table is provided with a series of mold-boxes, $a$, which are arranged in groups or sets around and near its rim, and are open at top and bottom. The sets are placed at equal distances apart, and, in this instance, eight sets of four boxes each, as shown.

An intermittent rotary motion is imparted to the mold-table in the following manner: A driving-shaft, $g$, is mounted in bearings in a frame, H, adjacent to the mold-table, and carrying fast and loose pulleys $g'$ $g''$, for the reception of a belt to transmit power from any suitable prime mover. A bevel-pinion, G'', upon the driving-shaft $g$, gears with a corresponding wheel, G', of larger diameter upon a vertical shaft, G, rotating in bearings upon the frame H. A connecting-rod, $h'$, is journaled at one end to a crank upon the shaft G, and at the other to a rocker-arm, D, which is loose upon the shaft A', and carries a pawl, $d$, upon its outer end. The shafts G and A' are so located relatively to each other, and the lengths of the crank on the shaft G and the rocker-arm D are so proportioned, that each revolution of the crank-shaft oscillates the rocker-arm forward and backward one-eighth of a revolution. At each forward movement of the rocker-arm its pawl engages one of eight ratchet-teeth, $a'$, on the upper portion of the mold-table, said ratchet-teeth being placed thereon at equal distances apart in a circle, the radius of which is equal to the length of the rocker-arm D. The mold-table will, therefore, be moved forward for one-eighth of a revolution by each forward movement of the rocker-arm, and will remain stationary while the latter is making its backward movement.

Each set of mold-boxes is provided with a series of pistons or plungers, I, one for each box, working from the lower side upward therein. The separate pistons of each set are secured to blocks $i$ carrying rollers $i'$, which traverse upon a circular track, K, supported upon columns K' below the mold-table A.

A bevel-gear, $a^2$, is formed upon or secured to the periphery of the mold-table A, and gears with a corresponding pinion, B'', upon a horizontal shaft, B', which shaft also carries a press-wheel, B, and a bevel-wheel, B'''. The press-wheel B rotates within a feed-box, $c$, and its shaft B' rotates in vertically-sliding boxes $c''$, placed in guides in the sides of the feed-box, being pressed downward by rubber springs $c'''$, and adjusting-springs $c^{iv}$. The object of this elastic adjustment of the press-wheel shaft is to insure sufficient, but not excessive, pressure being applied by the press-wheel to compact the clay in the mold-boxes as they successively pass beneath it. A mixer-wheel, C, having a cylindrical hub and a series of knives and beaters, arranged spirally thereon, is journaled in the feed-box $c$, and is rotated rapidly by means of the bevel-wheels $b'$ $b''$ upon the shaft $b$, one of which wheels, $b'$, meshes with the bevel-wheel B''', and the other, $b''$, with a corresponding wheel upon the shaft of the mixer-wheel. The mixer-wheel is arranged in advance of the press-wheel—that is to say, in such relative position thereto that in the traverse of the mold-table the mold-boxes will pass beneath it before reaching the press-wheel, and in the opposite end of the mold-box a knife, $c'$, is provided to remove the surplus clay from the mold-boxes after they have passed the press-wheel.

The clay, having been fed into the mold-boxes from the feed-box, compacted therein by a light pressure from the press-wheel, and the surplus removed by the knife, (these operations being performed during the rotation of the mold-table,) is next subjected to two successive pressures in the following manner: A bevel-gear, E', turns loosely upon the shaft A', immediately below the upper frame, and is provided with four ratchet-teeth, $e'$, set at equal distances apart upon its lower side, and actuated by a spring-pawl, $e$, upon the free end of a rocker-arm, E, placed loosely upon the shaft A'. The rocker-arm is coupled to a pin upon the bevel-gear G' by a connecting-rod, $h$, and is oscillated thereby, so that one revolution of the gear G' will rotate the bevel-gear E' one-fourth of a revolution. The bevel-gear E' in turn meshes with the bevel-pinions E'' E''', each one-fourth the diameter of its pitch circle, so that one-fourth of a revolution of the gear E' will impart one revolution to said bevel-pinions. The bevel-pinion E''' is secured upon a horizontal shaft, $e'''$, set at right angles to the shaft of the mixer-wheel, and the pinion E'' upon another horizontal shaft, $e''$, at right angles to the shaft $e'''$, and directly opposite the shaft of the mixer-wheel. The shaft $e''$ rotates in bearings upon the upper frame W, and upon an outer column, V'', and the shaft $e'''$ also has its bearings upon the upper frame, and, in addition, has an outer bearing supported by columns V'''. The ratchets upon the mold-table and bevel-gear E' are so disposed, relatively to each other, that when the mold-table is in motion the bevel-gear is stationary, and vice versa.

The details of the mechanism for applying the second pressure are shown in Fig. 2. A horizontal pressure-plate, L, is pivoted at one end to the central bracket Y, and is raised and lowered by means of toggle-joint levers $m'$ $m$, which connect its free end with the rod $f$ of a cam, F, on the shaft $e'''$. When lowered by the cam and levers, the pressure-plate is applied and held firmly to the top of the set of mold-boxes beneath it, and when raised it is entirely clear of the mold-table, so as to oppose no resistance to the movement thereof. Simultaneously with the application of the pressure-plate to the tops of the mold-boxes, pressure is applied to their pistons from below by a plunger, $k$, working in guides through an opening in the track K, and operated by toggle-joint levers $l$ $l'$, pivoted to the plunger, the bed-plate, and the rod $f'$ of a cam, F', on the shaft $e'''$. The plunger $k$ in its upward movement compresses the clay in the mold-boxes, and in its downward movement is drawn clear of the piston-blocks thereof before the mold-table commences its movement.

The details of the mechanism for applying the third and final pressure to the clay, and for recessing or paneling the bricks are shown in Figs. 4, 5, and 6. In this instance a lower pressure-plate, P, is hinged at one end to a standard, Z, upon the bed-plate, and has a pin upon its opposite end connected by a link, $p'$, to a triple crank, O, from which a connecting-rod, $f''''$, extends to a cam, F'''', on the shaft $e''$. A plunger, $k'$, passing through an opening in the track K, rests upon the pressure-plate P, and is applied and held firmly to the bottom of the piston-block of the mold-boxes by the cam F''''.

When the pressure-plate P is lowered, it rests upon a short column, P', on the bed-plate. A pressure-box, M, is pivoted at one end to the bracket Y, and connected at the other end by a link, $p$, to one arm of the triple crank O, so as to be applied to and held against the top of the mold-table at the same instant as the plunger $k'$ is applied to the piston-block. A series of guides are formed in the pressure-box M at such a point therein as that each guide shall be immediately above one of the mold-boxes of a set when the mold-table is stationary. Each guide serves to contain and direct a small plunger, $n$, the bottom of which plunger is of such form and dimensions as may be desired for the panel or recess to be made in the brick. A rubber spring, $n'$, is placed upon the top of each plunger, and a plate, $n''$, rests upon the springs $n'$. The plate $n''$ and the plunger $n$ are pressed down by toggle-joint levers $o\ o'$, pivoted to the upper frame W, and to the rod $f^2$ of a cam, $F^2$, on the shaft $e''$.

By means of the mechanism just described, the clay is compressed between the pistons I and pressure-box M, and there held while the panels or recesses are sunk in the upper faces of the bricks, the additional pressure of the plungers $n$, as modified and regulated by the interposition of the springs $n'$, serving to insure equal density and equal outside dimensions to the bricks in the several mold-boxes, irrespective of the amount of clay in each, as a deeper panel will be sunk if there is not sufficient clay in a mold-box, or a shallower one, if too much.

The final operations of expelling the finished bricks from the mold-boxes and removing them from the mold-table are performed by mechanism shown in Figs. 1 and 2. The pistons of the mold-boxes are elevated high enough to bring the lower edges of the bricks to the level of the top of the mold-table by a plunger, $q$, which is connected by a link, $q'$, with a crank, $r'$, on a horizontal shaft, $r$, which shaft is oscillated in its bearings by a cam, $F''''$, the frame of which is connected by a rod, $f''''$, with a crank, $r'''$, on the shaft $r$. The plunger passes through an opening in the track K, and, when raised, bears against the bottom of the piston-block, and thereby elevates the pistons of the mold-boxes to the desired height. As soon as the bricks are raised to the upper level of the mold-table they are pushed off the same by a sliding plate, R, moving on horizontal guides S, and operated by a cam, $F'''''$, upon the shaft $e'$, the plate being connected to a horizontal rock-shaft, T, by links $R'\ R''$. The rock-shaft and cam are connected by a rocker arm. $R'''$, and connecting-rod $R^4$, Fig. 4. The bricks may be received either upon boards or upon an endless conveyer-belt as they are pushed off the table by the plate R.

In the operation of the machine, as before stated, the clay is fed to the mold-boxes compacted therein, and the superfluous clay removed by the knife while the mold-table is in motion. The subsequent pressing and paneling of the bricks, and their removal from the mold-boxes and table, are all effected during the intervals of rest of the mold-table, these operations being respectively performed simultaneously on the clay in different sets of mold-boxes. The action of the machine is continuous by reason of the progressive movements of the mold-table.

I am aware that an intermittently-rotating mold wheel or table, containing mold-boxes, in which clay is compacted by impact or pressure, has been heretofore known, and do not, therefore, broadly claim such device.

I claim as my invention and desire to secure by Letters Patent—

1. The combination, in a brick-machine, of an intermittently revolving mold-table and its mold-boxes, a pressure-wheel rotating in a feed-box, a cam and toggle-joint levers, which compress the clay in the mold-boxes between a pressure-plate on the upper surface thereof and a plunger beneath said mold-boxes, and cams and toggle-joint levers, which compress the clay between a pressure-plate below the boxes and a pressure-box above them, said pressure-box being provided with downwardly-moving plungers having springs interposed between them and their operating levers, substantially as and for the purposes set forth.

2. The combination, in a brick-machine, of an intermittently-revolving mold-table and its mold-boxes with a vertically-moving plunger to expel the finished bricks from the mold-boxes, a horizontally-moving plate to remove the bricks from the mold-table, and cams and rocker-shafts which operate the plunger and plate during the intervals of rest of the mold-table, substantially as set forth.

3. The combination, in a brick-machine, of an intermittently-revolving mold-table and its mold-boxes, and a movable pressure-plate, which closes the tops of the mold-boxes during the intervals of rest of the mold-table, and is released therefrom during its motion, substantially as set forth.

4. The combination, in a brick-machine, of an intermittently-rotating mold-table and its mold-boxes, and a movable pressure-box, having separate plungers actuated by cams, each plunger being provided with an independent spring to regulate the pressure applied to the clay, substantially as set forth.

WILLIAM L. GREGG.

Witnesses:
W. H. WILDE,
O. O. G. ROBINSON.